US012619515B2

(12) United States Patent
Uppalapati et al.

(10) Patent No.: US 12,619,515 B2
(45) Date of Patent: May 5, 2026

(54) SYSTEM AND METHOD FOR PROFILING ON-CHIP PERFORMANCE OF NEURAL NETWORK EXECUTION

(71) Applicant: Deep Vision Inc., Los Altos, CA (US)

(72) Inventors: Satyanarayana Raju Uppalapati, Hyderabad (IN); Rajasekhar Reddy Ereddy, Hyderabad (IN); Sameek Banerjee, Hyderabad (IN); Mohammed Shahim, Thrissur (IN); Shilpa Kallem, Hyderabad (IN); Suresh Kumar Vennam, Hyderabad (IN); Abhilash Bharath Ghanore, Hyderabad (IN); Raju Datla, Hyderabad (IN); Wajahat Qadeer, Los Altos, CA (US); Rehan Hameed, Campbell, CA (US)

(73) Assignee: Deep Vision Inc., Los Altos, CA (US)

( * ) Notice: Subject to any disclaimer, the term of this patent is extended or adjusted under 35 U.S.C. 154(b) by 621 days.

(21) Appl. No.: 18/085,220

(22) Filed: Dec. 20, 2022

(65) Prior Publication Data

US 2023/0195590 A1 Jun. 22, 2023

Related U.S. Application Data

(60) Provisional application No. 63/291,893, filed on Dec. 20, 2021.

(51) Int. Cl.
G06F 11/34 (2006.01)
G06N 3/045 (2023.01)

(52) U.S. Cl.
CPC ...... G06F 11/3452 (2013.01); G06F 11/3409 (2013.01); G06N 3/045 (2023.01); G06F 11/3447 (2013.01)

(58) Field of Classification Search
USPC ......................................................... 702/179
See application file for complete search history.

(56) References Cited

U.S. PATENT DOCUMENTS

| | | | |
|---|---|---|---|
| 5,680,641 | A | 10/1997 | Sidman |
| 6,332,186 | B1 | 12/2001 | Elwood et al. |
| | | (Continued) | |

OTHER PUBLICATIONS

International Search Report mailed Sep. 18, 2018 in related International Application No. PCT/US2018/040721.

(Continued)

*Primary Examiner* — Paul D Lee
(74) *Attorney, Agent, or Firm* — Run8 Patent Group, LLC; Peter Miller; Brian T. Chew

(57) ABSTRACT

A method includes: accessing a static schedule of a target neural network for execution by a processing device, the target neural network including a set of layers; generating a set of expected performance metrics of the target neural network based on the static schedule, the set of expected performance metrics including a first expected performance metric for a first layer in the set of layers; accessing a set of runtime performance metrics captured during execution of the target neural network by the processing device, the set of runtime performance metrics including a first runtime performance metric for the first layer; and, in response to detecting a difference between the first runtime performance metric and the first expected performance metric exceeding a threshold, serving an alert at a user interface.

20 Claims, 5 Drawing Sheets

(56) References Cited

U.S. PATENT DOCUMENTS

| | | | |
|---|---|---|---|
| 6,901,422 | B1 | 5/2005 | Sazegari |
| 9,477,999 | B2 | 10/2016 | Hameed et al. |
| 11,436,014 | B2 | 9/2022 | Qadeer et al. |
| 11,513,847 | B2 | 11/2022 | Shahim et al. |
| 11,550,586 | B2 | 1/2023 | Shahim et al. |
| 2002/0174272 | A1 | 11/2002 | Fujii et al. |
| 2005/0210457 | A1 | 9/2005 | Guilford |
| 2007/0296729 | A1 | 12/2007 | Du et al. |
| 2008/0244220 | A1 | 10/2008 | Lin et al. |
| 2008/0291208 | A1 | 11/2008 | Keall |
| 2009/0238478 | A1 | 9/2009 | Banno |
| 2011/0115813 | A1 | 5/2011 | Yamakura |
| 2015/0046673 | A1 | 2/2015 | Barry et al. |
| 2015/0086134 | A1 | 3/2015 | Hameed et al. |
| 2015/0333984 | A1* | 11/2015 | Burns ..................... H04L 43/04 |
| | | | 709/224 |
| 2016/0219225 | A1 | 7/2016 | Zhu et al. |
| 2016/0283441 | A1 | 9/2016 | Grinberg et al. |
| 2016/0342433 | A1 | 11/2016 | Rencs |
| 2017/0371654 | A1 | 12/2017 | Bajic et al. |
| 2018/0004513 | A1 | 1/2018 | Plotnikov et al. |
| 2018/0005074 | A1 | 1/2018 | Shacham et al. |
| 2019/0065302 | A1* | 2/2019 | Cosgrove ............ G06F 11/0754 |
| 2019/0227893 | A1 | 7/2019 | Imber |
| 2019/0228284 | A1 | 7/2019 | Holland |
| 2019/0266015 | A1 | 8/2019 | Chandra et al. |
| 2019/0340499 | A1 | 11/2019 | Burger et al. |
| 2019/0370643 | A1* | 12/2019 | Aflalo .................... G06N 3/006 |
| 2019/0392300 | A1 | 12/2019 | Weber et al. |
| 2020/0034276 | A1 | 1/2020 | O'Dowd et al. |
| 2020/0193270 | A1 | 6/2020 | Wu et al. |
| 2020/0218962 | A1 | 7/2020 | Lee et al. |
| 2020/0242000 | A1 | 7/2020 | Khosrowpour et al. |
| 2020/0264876 | A1 | 8/2020 | Lo et al. |
| 2020/0293838 | A1* | 9/2020 | Li ......................... G06F 9/5066 |
| 2020/0357045 | A1 | 11/2020 | Guo et al. |
| 2021/0073614 | A1 | 3/2021 | Dikici et al. |
| 2021/0081789 | A1* | 3/2021 | Chai ....................... G06N 3/10 |
| 2021/0191765 | A1 | 6/2021 | Bokam et al. |
| 2021/0373792 | A1 | 12/2021 | Shahim et al. |
| 2022/0067527 | A1 | 3/2022 | Xu et al. |
| 2022/0308977 | A1* | 9/2022 | Slinger ............... G06F 11/3409 |

OTHER PUBLICATIONS

Lo et al., "Fixed-Point Implementation of Convolutional Neural Networks for Image Classification" 2018 International Conference on Advanced Technologies for Communications (Year: 2018).

Non-Final Office Action for U.S. Appl. No. 16/026,480 dated Dec. 28, 2018.

Non-Final Office Action for U.S. Appl. No. 16/670,800 dated Oct. 9, 2020.

Non-Final Office Action for U.S. Appl. No. 17/112,889 dated Oct. 27, 2022.

Non-Final Office Action for U.S. Appl. No. 17/331,585 dated May 26, 2022.

Non-Final Office Action for U.S. Appl. No. 17/356,372 dated Feb. 16, 2022.

Non-Final Office Action for U.S. Appl. No. 17/868,438 dated Dec. 21, 2022.

Notice of Allowance and Fees Due for U.S. Appl. No. 16/670,800 dated Apr. 15, 2021.

Office Action received in CN Office Action No. 201880057582.3 dated Mar. 2, 2023.

Search Report Received in ROC Application No. 110134170 dated May 31, 2022.

* cited by examiner

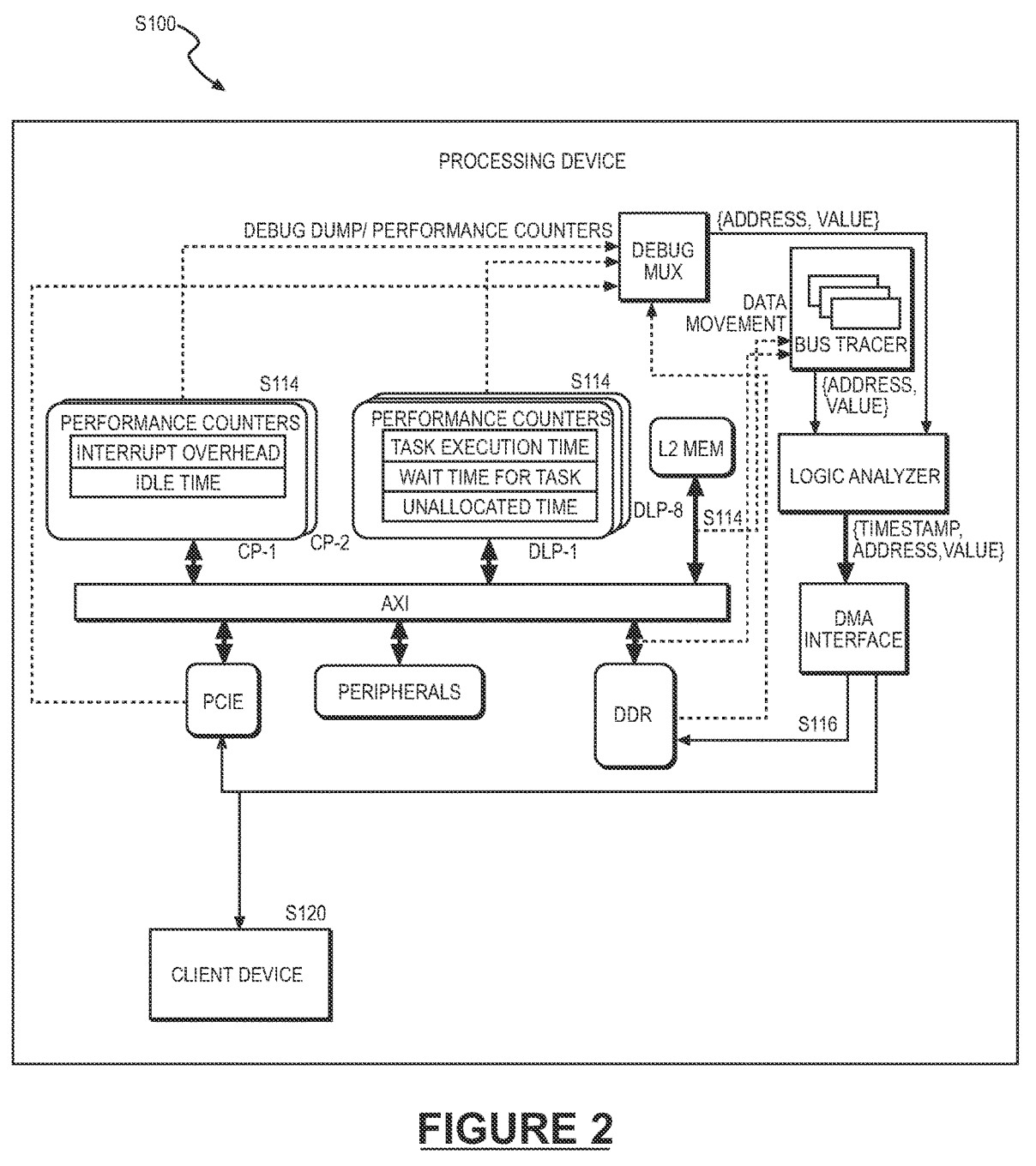

S100

PROCESSING DEVICE

DEBUG DUMP/ PERFORMANCE COUNTERS

DEBUG MUX

{ADDRESS, VALUE}

DATA MOVEMENT

BUS TRACER

{ADDRESS, VALUE}

S114

PERFORMANCE COUNTERS
INTERRUPT OVERHEAD
IDLE TIME

CP-1

S114

PERFORMANCE COUNTERS
TASK EXECUTION TIME
WAIT TIME FOR TASK
UNALLOCATED TIME

CP-2    DLP-1    DLP-8

L2 MEM

S114

LOGIC ANALYZER

{TIMESTAMP, ADDRESS, VALUE}

AXI

PCIE    PERIPHERALS    DDR

DMA INTERFACE

S116

S120

CLIENT DEVICE

FIGURE 2

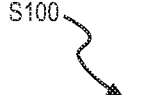
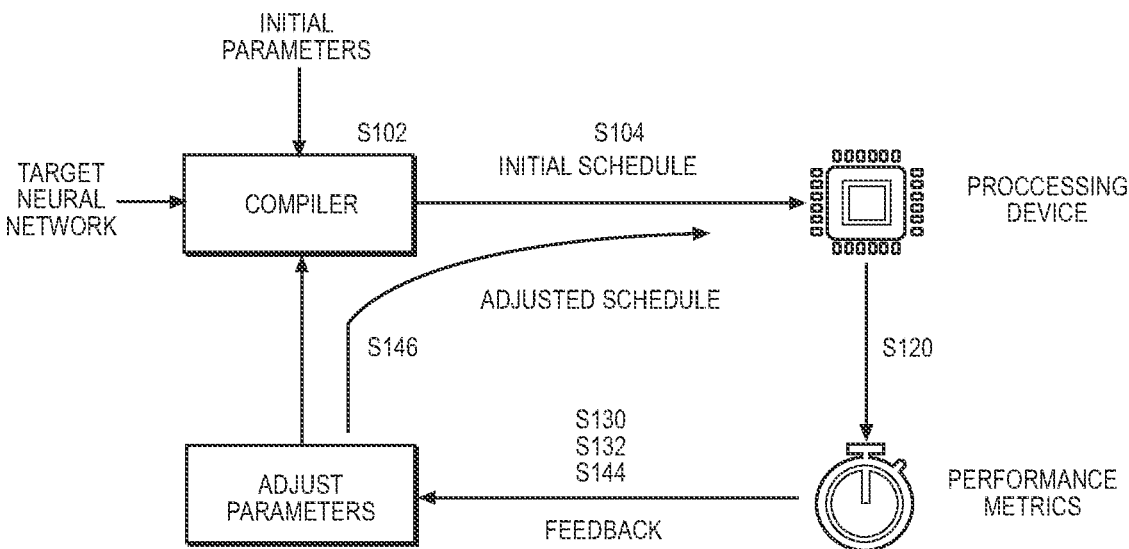
FIGURE 6

SYSTEM AND METHOD FOR PROFILING ON-CHIP PERFORMANCE OF NEURAL NETWORK EXECUTION

CROSS-REFERENCE TO RELATED APPLICATIONS

This application claims the benefit of U.S. Provisional Application No. 63/291,893, filed on 20 Dec. 2021, which is incorporated in its entirety by this reference.

This application is related to U.S. patent application Ser. No. 17/127,904, filed on 18 Dec. 2020, U.S. patent application Ser. No. 17/356,372, filed on 23 Jun. 2021, U.S. patent application Ser. No. 17/211,707, filed on 24 Mar. 2021, U.S. patent application Ser. No. 17/331,585, filed on 26 May 2021, and U.S. patent application Ser. No. 17/331, 590, filed on 26 May 2021, each of which is incorporated in its entirety by this reference.

TECHNICAL FIELD

This invention relates generally to the field of artificial neural network computation and more specifically to a new and useful system and method for profiling on-chip performance of neural network execution within the field of artificial neural network computation.

BRIEF DESCRIPTION OF THE FIGURES

FIG. 2 is a flowchart representation of one variation of the method;

FIG. 6 is a flowchart representation of one variation of the method.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. METHODS

Figure 1:
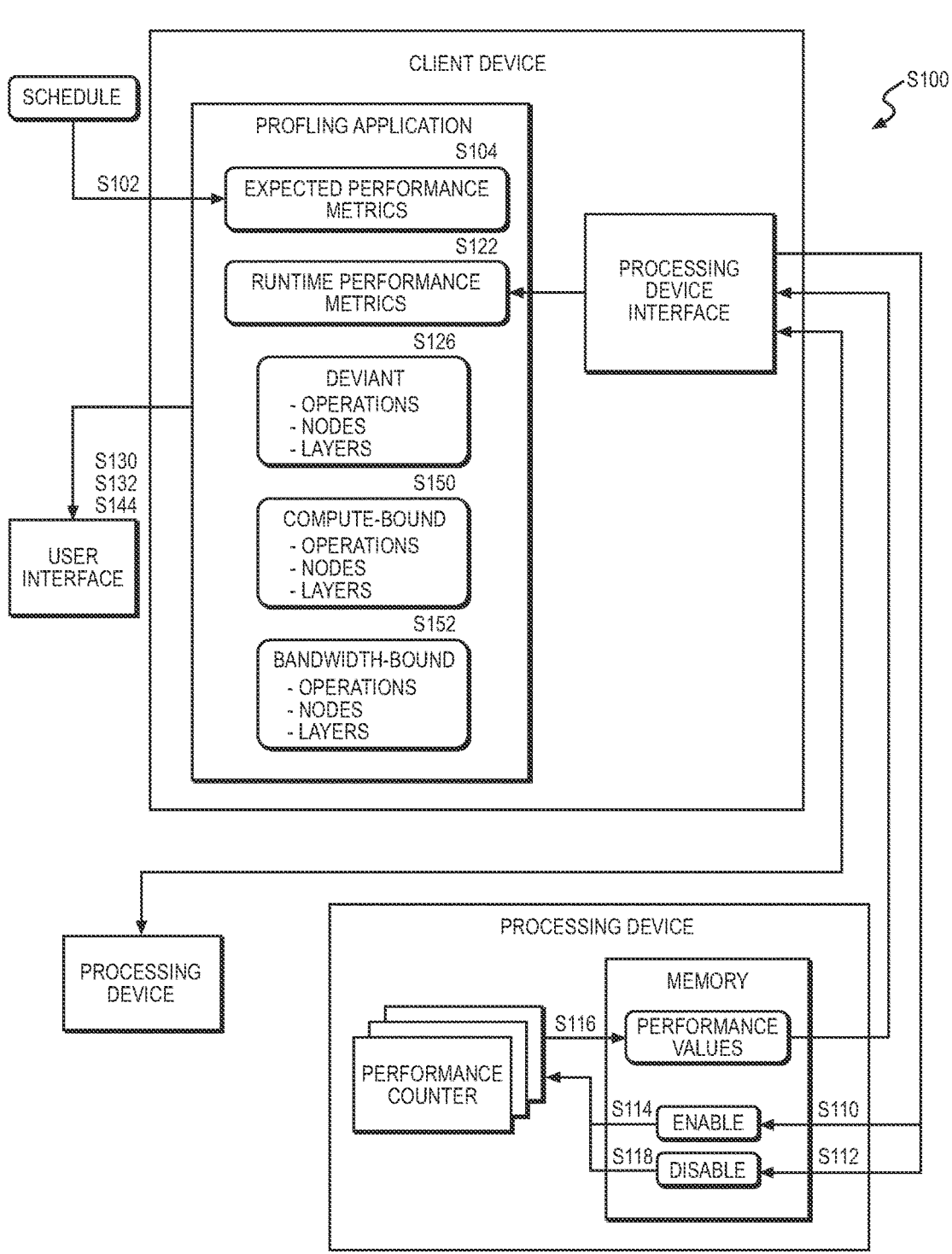
FIG. 1 is a flowchart representation of a method.
Figures 3, 4:
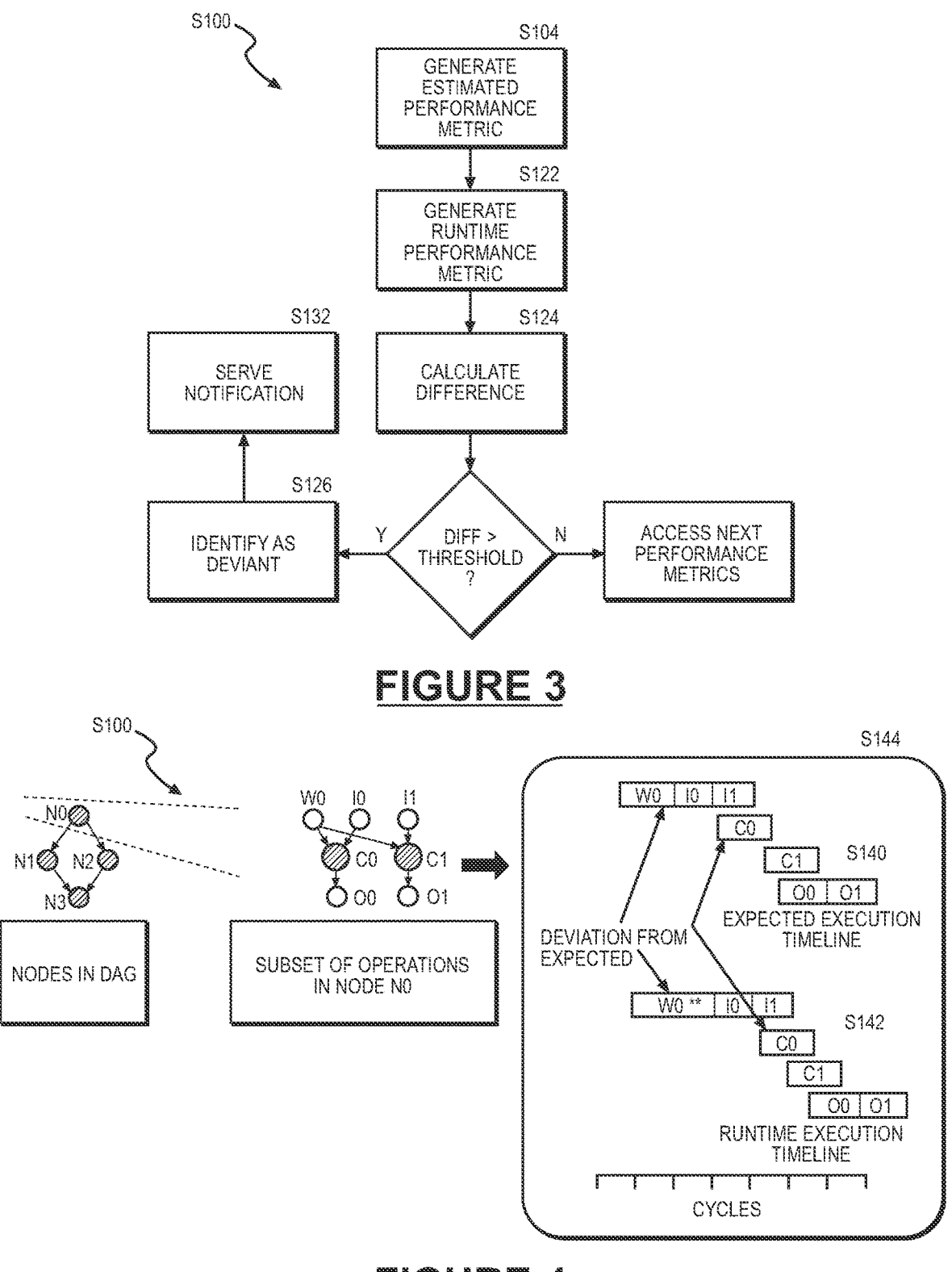
FIG. 3 is a flowchart representation of one variation of the method.
FIG. 4 is a graphical representation of one variation of the method.

As shown in FIGS. 1-3, a method S100 for profiling neural network performance includes: accessing a static schedule of a target neural network for execution by a processing device in Block S102, the target neural network including a set of layers defining a set of operations; generating a set of expected performance metrics for the target neural network based on the static schedule in Block S104, the set of expected performance metrics including a first subset of expected performance metrics for the set of operations; and generating a set of runtime performance metrics during execution of the target neural network by the processing device in Block S122, the set of runtime performance metrics including a first subset of runtime performance metrics for the set of operations.

The method S100 further includes, for each operation in the set of operations: calculating a first difference between a runtime performance metric, in the first subset of runtime performance metrics, for an operation and a corresponding estimated performance metric, in the first subset of estimated performance metrics, for the operation in Block S124; and, in response to detecting the first difference exceeding a first threshold, adding the operation to a subset of deviant operations in the set of operations in Block S128. The method S100 further includes serving, at a user interface, a notification indicating the subset of deviant operations in Block S132.

1.1 Variation: Real-Time Profiling

As shown in FIGS. 1-3, one variation of the method S100 for profiling neural network performance includes: accessing a first static schedule of a target neural network for execution by a first processing device including a first set of resources in Block S102, the target neural network including a set of layers defining a set of operations; and generating a first set of expected performance metrics for the target neural network based on the first static schedule in Block S104, the first set of expected performance metrics including a first expected performance metric for a first operation in the set of operations. This variation of the method S100 further includes, during execution of the target neural network by the first processing device: accessing a first set of performance values captured by a set of performance counters in the first processing device in Block S120; generating a first set of runtime performance metrics for the target neural network based on the first set of performance values in Block S122, the first set of runtime performance metrics including a first runtime performance metric for the first operation; and, in response to detecting a difference between the first runtime performance metric and the first expected performance metric exceeding a first threshold, serving an alert at a user interface in Block S132.

1.2 Variation: Layer-Level Performance Deviation

As shown in FIGS. 1-3, one variation of the method S100 for profiling neural network performance includes: accessing a static schedule of a target neural network for execution by a processing device in Block S102, the target neural network including a set of layers; generating a set of expected performance metrics of the target neural network based on the static schedule in Block S104, the set of expected performance metrics including a first expected performance metric for a first layer in the set of layers; accessing a set of runtime performance metrics captured during execution of the target neural network by the processing device in Block S122, the set of runtime performance metrics including a first runtime performance metric for the first layer; and, in response to detecting a difference between the first runtime performance metric and the first expected performance metric exceeding a threshold, serving an alert at a user interface in Block S132.

2. APPLICATIONS

Generally, Blocks of the method S100 can be executed by a system including a processing device executing a neural network application and a client device executing a profiling application to measure performance of the processing device during execution of the neural network application. More specifically, Blocks of the method S100 can be executed by the system to: access a static schedule of the neural network defining a set of layers for execution by the processing device; predict a set of expected performance metrics—such as processor utilization, memory bandwidth utilization, estimated power consumption, a number of inferences per second, and/or accuracy—of the neural network based on the static schedule; and generate a set of runtime performance metrics corresponding to these expected performance metrics during execution of the neural network by the processing device.

Accordingly, Blocks of the method S100 can be executed by the system to: provide accurate runtime performance measurement of the neural network; enable real-time management of the processing device during execution of the neural network; and reconcile deviations between expected and runtime behavior of the neural network on the processing device, thereby enabling adjustments to scheduling and/or network parameters to improve runtime performance of the neural network on the processing device.

2.1 Performance Metric Granularity

Additionally, Blocks of the method S100 can be executed by the system to: generate expected and runtime performance metrics at various levels of granularity (e.g., descriptor-level, layer-level, network-level, device-level) for the neural network and/or the processing device; and identify deviations in expected and runtime behavior at these various levels of granularity, such as identifying a subset of deviant operations (or a subset of deviant layers) exhibiting runtime performance metrics that deviate from corresponding expected performance metrics for these operations beyond a threshold amount.

Accordingly, because certain processes of the processing device may be not accurately modeled by compile-time prediction (e.g., DDR performance, shared memory performance, interrupt behavior), Blocks of the method S100 can be executed by the system to identify problems in execution of specific portions (e.g., operations, nodes, layers) of the target neural network by comparing expected performance metrics generated at compile-time to the runtime performance metrics generated during execution. Therefore, the system can provide feedback—at various levels of granularity—to a user, thereby enabling the user to pinpoint bottlenecks in the neural network and adjust parameters and/or topology based on this feedback to increase performance of the neural network.

2.2 Example

In one example application, Blocks of the method S100 are executed by the system to: reconstruct predicted and runtime execution timelines of a neural network on a processing device; and generate a visualization depicting these execution timelines as a function of overall execution time. More specifically, Blocks of the method S100 can be executed by the system to: generate a first execution timeline representing expected execution of the neural network based on a static schedule and expected performance metrics of the neural network; generate a second execution timeline representing execution of the neural network by the processing device based on the set of runtime performance metrics; and generating a visualization aligning and/or overlaying these execution timelines to highlight differences between expected and runtime performance.

Accordingly, Blocks of the method S100 can be executed by the system to depict deviations between the expected execution timeline and the actual execution timeline of the target neural network, thereby enabling a user to reconcile differences between expected and runtime execution of the target neural network on a processing device and debug specific (e.g., deviant) operations, nodes, and/or layers of the target neural network.

3. SYSTEM

Generally, as shown in FIGS. 1 and 2, the system can include: a client device executing a profiling application; a processing device (e.g., cooperative processing device, application-specific integrated circuit (or "ASIC") including multiple processing units); and a processing device interface communicatively coupling the client device and the processing device. More specifically, the client device can: access performance metrics captured by the processing device during execution of a target neural network by this processing device; and transmit commands to the processing device to enable or disable runtime measurement of particular performance metrics.

Generally, the system can include additional processing devices communicatively coupled to the client device via the processing device interface (or additional processing device interfaces).

In one implementation, the additional processing devices can include redundant (e.g., identical) processing devices characterized by a particular device type. In this implementation, these redundant processing devices can cooperatively execute the target neural network. Accordingly, the redundant processing devices can perform failover and/or load balancing operations as described below.

In another implementation, the additional processing devices can include a first processing device (or a first set of processing devices) characterized by a first device type and a second processing device (or a second set of processing devices) characterized by a second device type different from the first device type (e.g., different number of resources, different specification of resources, different architecture, different manufacturer, different model). Accordingly, the system can profile execution of the target neural network on these processing devices of different device types, thereby detecting a higher-performing device type for the target neural network, as described below.

3.1 Processing Device Interface

In one implementation, the client device can communicate (e.g., via socket communication) with a proxy server or daemon within a network (e.g., local area network or wide area network). In this implementation, the proxy server can communicate with one or more processing devices via a driver (e.g., userspace input/output driver, kernel-space driver), a library associated with the client application, and an interface (e.g., PCIe interface, USB interface). Thus, the system can facilitate communication with multiple distributed processing devices simultaneously via the intervening proxy server.

In another implementation, the client device can communicate directly with a processing device via an interface (e.g., PCIe interface, USB interface) and a library associated with the client application.

3.2 Processing Device

Generally, a processing device can include: a set of resources (e.g., processing units, queue processor(s), direct memory access (or "DMA") cores, transfer buses); a set of performance monitor registers; a debug multiplexer, debug logic, and/or a debug DMA core.

In one implementation, the processing device can include an ASIC multicore processor controllable via a memory-mapped main memory (e.g., DDR SDRAM). For example, the processing device can include a set of resources, including a set of processing units described in U.S. patent application Ser. No. 17/356,372, filed on 23 Jun. 2021, a queue processor described in U.S. patent application Ser. No. 17/211,707, filed on 24 Mar. 2021, and a set of DMA cores described in U.S. patent application Ser. Nos. 17/331, 585 and 17/331,590, filed on 26 May 2021, each of which is incorporated in its entirety by this reference.

In another implementation, the processing device can generate inferences based on a target neural network. For example, the processing device can execute a scheduled (e.g., compiled) parallel process—representing the target neural network—to generate an inference based on an input (e.g., an image input) to the target neural network.

3.2.1 Performance Monitor Register

Generally, the processing device can include a set of performance monitor registers (e.g., performance counters) configured to monitor events occurring during operation of the processing device.

In one implementation, each performance monitor register can monitor (or capture) a performance value (or a set of performance values) during execution of a target neural network. For example, the processing device can include a set of performance counters configured to: monitor interrupt latency (in number of cycles of a control processor); monitor idle time (in number of cycles of a control processor); monitor task execution time (in number of cycles of a processing unit or DMA core); monitor task wait time (in number of cycles of a processing unit or DMA core); and/or monitor unallocated time (in number of cycles of a processing unit or DMA core). In this example, each performance counter is communicatively coupled (on silicon) to an associated region of the processing unit.

Additionally, in implementations of the processing device including multiple control processors, multiple DMA cores, and/or multiple processing units, the processing device can include a corresponding set of performance monitor registers coupled to each associated component in order to provide component-specific performance metrics during execution of the scheduled parallel process representing the target neural network.

Additionally, the processing device can include performance monitor registers configured to enable or disable recording an associated performance metric in response to signals (e.g., register commands) transmitted to the processing device (e.g., via a PCIe bus, another peripheral bus, or via a mapped region of main memory), as described below.

In one implementation, the processing device can also include a set of bus tracers configured to capture data movement events between memory locations in the processing device.

3.2.2 Debug Multiplexer

Generally, the processing device can include a debug multiplexer communicatively coupled to each performance monitor register and to the debug logic.

In one implementation, the debug multiplexer can select a performance monitor register from which to extract a performance metric captured by the performance monitor register based on input from a pre-mapped memory region of the main memory. In particular, the debug multiplexer can transfer values of performance metrics (or performance values) and addresses (in the main memory of the processing device) to which these performance metrics are to be stored by the processing device. Thus, the processing device can utilize the debug multiplexer to extract values of the performance metrics captured by each performance monitor register.

In one implementation, the debug multiplexer can extract performance metrics according to signals (e.g., instructions, commands) stored within a main memory communicatively coupled to the debug multiplexer. More specifically, the profiling application can store signals to a set of memory regions (e.g., registers) in the main memory to selectively enable and/or disable the performance monitor register via the debug multiplexer. In this implementation, the debug multiplexer can extract data (e.g., performance values, performance metrics) from a subset of enabled performance monitor registers based on the signals stored in the set of memory regions in the main memory of the processing device. Accordingly, the system can modify the set of performance metrics captured during runtime of the processing device based on the signals stored in the main memory of the processing device.

3.2.3 Debug Logic

Generally, the processing device can include debug logic configured to: access metadata indicating layer and/or progress information of the processing device during execution of the target neural network; extract performance metrics via the debug multiplexer; and generate a timestamp for these performance metrics.

In one implementation, the debug logic can detect a current layer being executed by the processing device concurrent with performance metrics extracted by the debug multiplexer based on layer metadata present within a queue of a control processor of the processing device. In this implementation, the debug logic can read a set of bits corresponding to a layer ID from each dequeued command in the control processor to identify the current layer being executed by the processing device. Additionally or alternatively, the debug logic can read layer metadata (e.g., layer ID) included in a DMA descriptor defining a data transfer between memory units in the processing device. Accordingly, the debug logic can enable accurate and contextual extraction of performance metrics based on a current execution status of the target neural network by the processing device.

3.2.4 Debug DMA Core

Generally, the processing device can include a debug DMA core communicatively coupled to the debug logic and configured to transfer timestamped and layer-labeled performance metrics to pre-mapped memory locations within the main memory of the processing device based on a type of performance metric and/or a layer associated with the performance metric. Additionally or alternatively, the debug DMA core can transfer performance metrics to a peripheral device (e.g., via a PCIe interface). Accordingly, the debug DMA core can transmit captured performance metrics to a storage location that is readable by the client device executing the profiling application.

In one implementation, the debug DMA core can include a dedicated DMA core configured to transfer performance metric values to pre-mapped locations in main memory. Alternatively, the processing device can utilize idle cycles of a non-dedicated DMA core to extract performance metrics.

4. TARGET NEURAL NETWORK

Block S102 of the method S100 recites accessing a static schedule of a target neural network for execution by a processing device, the target neural network including a set of layers defining a set of operations.

Generally, the system can access a static schedule for a target neural network. More specifically, the system can access (or generate) a static schedule for a target neural network defining a set of layers, each layer in the set of layers characterized by: a layer type; a set of input tensor dimensions; and a set of weight tensor dimensions. Additionally, the system can access a static schedule of a target neural network defining a set of operations (e.g., compute operations, memory transfer operations, dependencies) that, when executed by the processing device, generate an inference based on an input to the target neural network. In particular, each layer in the set of layers can define a subset of operations in the set of operations of the neural network.

In one implementation, the system can access a target neural network defined via a deep-learning framework (e.g., CAFFE, TENSORFLOW, or TORCH) to identify a set of layers in the neural network. In this implementation, the system can identify, for each layer in the set of layers: a layout of the layer relative to other layers in the set of layers; a layer type of the layer; a set of input tensor dimensions of the layer; and a set of weight tensor dimensions of the layer.

In one implementation, the system can access a static schedule of a target neural network for execution on a processing device, such as described in U.S. patent application Ser. No. 17/127,904, filed on 18 Dec. 2020, which is incorporated in its entirety by this reference.

In another implementation, the system can assign a layer ID to each layer in the target neural network. In this implementation, the system can associate a layer of the target neural network with performance metrics extracted by the processing device during execution of the target neural network by the processing device, such as based on these layer IDs.

4.1 Directed Acyclic Graph

Generally, the system can generate a graph, such as a directed acyclic graph (or "DAG"), representing execution of a target neural network on a processing device.

In one implementation, the system can generate a DAG for each layer in the set of layers defined by a neural network. In this implementation, the system can generate each DAG defining: a set of compute nodes representing a set of compute operations in a layer for a set of processor cores in the processing device, a set of data transfer nodes representing a set of data transfer operations in a layer for a set of DMA cores in the processing device, and a set of edges representing dependencies between the set of compute operations and the set of data transfer operations.

In another implementation, the system can access the static schedule assigning a set of nodes, defining the set of operations in a directed acyclic graph, to a set of resources in the processing device.

5. COMPILE-TIME PERFORMANCE PREDICTION

Block S104 of the method S100 recites generating a set of expected performance metrics for the target neural network based on the static schedule.

Generally, the system can predict a set of expected performance metrics for the target neural network.

In one implementation, in Block S104, the system can generate a set of expected performance metrics for the target neural network based on the static schedule. More specifically, the system can compile the scheduled parallel process (e.g., the static schedule) representing the target neural network into a series of steps (e.g., a set of operations) executable by the processing device; access a cost model defining a set of costs (computation costs, memory costs, power costs) for execution of each operation in the set of operations by the processing device; and, during compile-time of the target neural network, generate the set of expected performance metrics based on the static schedule and the cost model.

Generally, the system can generate expected performance metrics representing performance of the target neural network on the processing device at various levels of granularity (e.g., descriptor-level, layer-level, network-level, device-level).

Accordingly, the system can predict a set of expected performance metrics for the target neural network (i.e., for execution by the processing device) at various levels of granularity, thereby establishing benchmarks with which runtime performance metrics captured during execution of the target neural network by the processing device can be compared.

5.1 Descriptor-Level Expected Performance Metrics

In one implementation, the system can generate the set of expected performance metrics including a first subset of expected performance metrics for the set of operations. In this implementation, the system can generate an expected performance metric (or a subset of expected performance metrics) for each operation in the set of operations.

For example, the system can generate a first expected performance metric (or a first subset of expected performance metrics) for a first operation in the set of operations based on the static schedule. In this example, the system can generate the first expected performance metric representing an expected computational cost (in cycles of a processing unit) of executing the first operation by the processing device. Additionally, the system can generate expected performance metrics representing an expected bandwidth cost (in cycles of a DMA core) of the first operation, an expected power cost of the first operation, and/or an expected accuracy (or expected accuracy loss) of the first operation, etc.

5.2 Layer-Level Expected Performance Metrics

In another implementation, the system can generate the set of expected performance metrics including a second subset of expected performance metrics for the set of layers. In this implementation, the system can generate an expected performance metric (or a subset of expected performance metrics) for each layer in the set of layers.

For example, the system can generate a third expected performance metric (or a third subset of expected performance metrics) for a first layer in the set of layers based on the static schedule. In this example, the system can generate the third expected performance metric representing an expected computational cost (in cycles of a processing unit) of executing the first layer by the processing device. Additionally, the system can generate expected performance metrics representing an expected bandwidth cost (in cycles of a DMA core) of the first layer, an expected power cost of the first layer, and/or an expected accuracy (or expected accuracy loss) of the first layer, etc.

Similarly, the system can generate the set of expected performance metrics including a third subset of expected performance metrics for the set of nodes in a DAG representing the target neural network. In this implementation, the system can generate an expected performance metric (or a subset of expected performance metrics) for each node in the set of nodes.

5.3 Network-Level Expected Performance Metrics

In another implementation, the system can generate the set of expected performance metrics including a fourth subset of expected performance metrics for the overall target neural network.

For example, the system can generate a fourth expected performance metric (or a fourth subset of expected performance metrics) for the target neural network based on the static schedule. In this example, the system can generate the fourth expected performance metric representing a speed (in a number of inferences per second) of executing the target neural network by the processing device. Additionally, the system can generate expected performance metrics representing an expected computational cost (in cycles of a processing unit) of the target neural network, an expected bandwidth cost (in cycles of a DMA core) of the target neural network, an expected power cost of the target neural network, and/or an expected accuracy (or expected accuracy loss) of the target neural network, etc.

5.4 Device-Level Expected Performance Metrics

In another implementation, the system can generate the set of expected performance metrics including a fifth subset of expected performance metrics for the processing device. In this implementation, the system can generate an expected performance metric (or a subset of expected performance metrics) for each resource in the set of resources of the processing device and/or for the processing device overall.

For example, the system can generate a fifth expected performance metric (or a fifth subset of expected performance metrics) for the processing device based on the static schedule. In this example, the system can generate the fifth expected performance metric representing an expected utilization of a first processing unit (in cycles of the first processing unit) in a set of processing units within the processing device. More specifically, the system can generate the fifth expected performance metric representing the expected utilization of the first processing unit for execution of each operation in the set of operations, each node in the set of nodes, each layer in the set of layers, and/or the target neural network. The system can similarly generate an expected performance metric (or subset of expected performance metrics) for each resource (e.g., DMA core, transfer bus, communication bus, PCIe bus, AXI bus) in the set of resources of the processing device.

Additionally, the system can generate expected performance metrics representing interrupt latency (in number of cycles of a control processor), idle time (in number of cycles of a control processor), task execution time (in number of cycles of a processing unit or DMA core), task wait time (in number of cycles of a processing unit or DMA core), and/or unallocated time (in number of cycles of a processing unit or DMA core), etc.

6. RUNTIME PERFORMANCE VERIFICATION

Block S122 of the method S100 recites, generating a set of runtime performance metrics during execution of the target neural network by the processing device.

Generally, the system can: access performance values captured by a set of performance counters in the processing device during execution of the target neural network; and generate a set of runtime performance metrics for the target neural network based on these performance values.

Additionally, the system can perform runtime verification based on data stored in memory of the processing device and/or in a host device of the processing device. More specifically, the system can: transfer a set of instructions specifying a set of layer-level performance metrics and network-level performance metrics to a first memory mapped location within the main memory of processing device via the processing device interface; and retrieve performance metrics from a second memory mapped location within the main memory of the processing device. Thus, upon execution of the target neural network by the processing device, the system can obtain a set of captured layer-level performance metrics and a set of network-level performance metrics from the processing device via the processing device interface.

6.1 Performance Metric Extraction

Blocks of the method S100 recite: accessing a set of performance values captured by a set of performance counters in the processing device during execution of the target neural network in Block S120; and generating the set of runtime performance metrics based on the set of performance values in Block S122.

Blocks of the method S100 recite: capturing, at a set of performance counters in the processing device, a set of performance values of a set of resources in the processing device during execution of the target neural network in Block S144; storing the set of performance values in a memory unit in the processing device in Block S116; and accessing the set of performance values from the memory unit in Block S120.

Generally, the processing device can capture performance values of a set of resources during execution of a target neural network. More specifically, the processing device can: capture these performance values utilizing performance counters in the processing device; and periodically transmit (or store) these captured performance values from the performance counters to a memory unit (e.g., main memory, DDR SDRAM). The client device (e.g., the profiling application executing on the client device) can then access the captured performance values from the memory unit, such as via a processing device driver.

In one implementation, the system (e.g., the processing device) can: capture, at a set of performance counters in the processing device, a set of performance values of a set of resources in the processing device during execution of the target neural network in Block S114; and store the set of performance values in a memory unit in the processing device in Block S116. More specifically, the processing device can periodically store the set of performance values according to a predefined interval (e.g., 100 milliseconds, 1 second, 10 seconds).

In another implementation, the system (e.g., the client device) can: access the set of performance values from the memory unit in Block S120; and generate the set of runtime performance metrics based on the set of performance values in Block S122.

In one example, the client device can poll the processing device for the performance values according to a predefined period (e.g., 10o milliseconds, 1 second, 10 seconds). More specifically, the client device (e.g., processing device driver in the client device) can trigger an interrupt in the processing device for the performance values. The processing device can transmit the performance values to the client device in response to the interrupt. In another example, the processing device (e.g., runtime engine executing on the processing device) can stream the performance values to the client device.

In another implementation, the processing device can capture a set of runtime performance metrics (e.g., descriptor-level performance metrics, layer-level performance metrics, network-level performance metrics, device-level performance metrics) via the components described above. More specifically, the processing device can: activate a set of performance monitor registers based on signals (e.g., instructions, commands) stored in a memory-mapped region of a memory unit (e.g., main memory unit, DDR SDRAM) of the processing device; and, in response to detecting a change in layer execution by the processing device (e.g., initiating execution of a current layer), initiate a performance metric extraction process to store performance metrics (e.g., layer-level performance metrics) captured by the performance monitor registers in the main memory of the processing device. Additionally, the processing device can initiate extraction of network-level performance metrics in response to completing execution of the target neural network.

In another implementation, the processing device can detect a change in layer execution via the debug logic by reading metadata from a set of DMA cores to identify a change in layer metadata between DMA descriptors. The processing device can: select a subset of performance monitor registers recording layer-level performance metrics via the debug multiplexer; and transfer these performance metrics to the main memory of the processing device via the debug DMA. In this implementation, the processing device can initiate a performance metric extraction process for each layer of the target neural network executed by the processing device.

Additionally or alternatively, the system can implement instrumented runtime code (e.g., software, firmware) to capture and/or calculate performance metrics. For example, by executing the instrumented runtime code, the processing device can capture, normalize, and/or collect performance values at regular intervals, which can then be accessed by the client device as described above.

Accordingly, the system can selectively utilize performance counters and/or instrumented runtime code to generate performance metrics during execution of the target neural network, thereby enabling the system to minimize overhead (e.g., resource utilization of the processing device) required to generate these performance metrics.

6.1.1 Selective Profiling

Block S112 of the method S100 recites writing, to a first memory region mapped to a first performance counter in the set of performance counters, a signal representing a command to disable the first performance counter.

Block S114 of the method S100 recites capturing the set of performance values in response to detecting a signal representing a command to enable the set of performance counters.

Generally, the system can selectively capture and/or extract performance metrics on the processing device based on signals—representing commands to enable and/or disable the performance monitor registers (e.g., performance counters)—stored in a memory unit of the processing device.

In one implementation, in Block S110, the client device can write a first signal—representing a command to enable the set of performance counters—to a memory region in a memory unit of the processing device. In response to detecting the first signal representing the command to enable the set of performance counters, the processing device can capture the set of performance values at the set of performance counters in Block S114.

Similarly, the client device can write a second signal—representing a command to disable the set of performance counters—to the memory region in Block S112, and the processing device can cease capturing the set of performance values at the set of performance counters in response to detecting the second signal in Block S118.

Additionally or alternatively, the system can selectively enable and/or disable each performance monitor register based on signals stored in a set of memory regions, each memory region in the set of memory regions mapped to a performance monitor register. More specifically, in Block S110, the client device can write a first signal—representing a command to enable a first performance counter in the set of performance counters—to a first memory region, in the memory unit, mapped to the first performance counter. In response to detecting the first signal in the first memory region, the processing device can enable capture and/or extraction of performance values at the first performance counter in Block S114. The client device can similarly write a second signal representing a command to disable the first performance counter to the first memory region in Block S112, and the processing device can cease capturing and/or extracting performance values at the first performance counter in response to detecting the second signal in Block S118.

6.1.2 Layer Amortization

Generally, the processing device can selectively extract performance metrics for a subset of layers in a first inference (i.e., an execution of the target neural network); and extract performance metrics for layers in subsequent inferences. By modifying the subset of layers for which the processing device extracts performance metrics over a series of inferences, the processing device can still obtain layer-level performance metrics for each layer of the target neural network. Thus, in this implementation, the processing device can amortize the processing load consumed by layer-level performance metric extraction over multiple inferences and avoid detrimental effects on network-level performance metrics (e.g., IPS, total power consumption). This implementation is especially valuable for applications involving live performance monitoring of the processing device. In a live performance monitoring application, the processing device can limit the effects of performance monitoring on overall performance while still obtaining live performance metrics (assuming the processing device is executing the target neural network at a high frequency).

In this implementation, the processing device can store instructions for the debug multiplexer to enable or disable a subset of performance register monitors for a subset of layers of the target neural network. Therefore, in response to the instructions stored in the main memory of the processing device, the debug multiplexer does not access the subset of performance register monitors for the subset of layers, thereby saving the processing time required of the debug DMA to transfer the performance metrics stored therein from the performance register monitors to the main memory of the processing device.

6.2 Runtime Performance Metrics

Generally, the system can generate runtime performance metrics representing performance of the target neural network during execution by the processing device at various levels of granularity (e.g., descriptor-level, layer-level, network-level, device-level). More specifically, the system can generate a set of runtime performance metrics corresponding to a set of expected performance metrics.

Accordingly, because certain processes of the processing device may be not accurately modeled by compile-time prediction (e.g., DDR performance, shared memory performance, interrupt behavior), the system can thus identify problems in execution of the target neural network by comparing the expected performance metrics generated at compile-time to the runtime performance metrics generated during execution.

6.2.1 Descriptor-Level Runtime Performance Metrics

In one implementation, the system can generate the set of runtime performance metrics including a first subset of runtime performance metrics for the set of operations. In this implementation, the system can generate a runtime performance metric (or a subset of runtime performance metrics) for each operation in the set of operations.

For example, the system can generate a first runtime performance metric (or a first subset of runtime performance metrics) for a first operation in the set of operations during execution of the target neural network by the processing device. In this example, the system can generate the first runtime performance metric representing a computational cost (in cycles of a processing unit) during execution of the first operation by the processing device. Furthermore, this first runtime performance metric for the first operation can correspond to the first expected performance metric representing the expected computational cost of executing the first operation by the processing device.

Additionally, the system can generate runtime performance metrics representing a runtime bandwidth cost (e.g., memory bandwidth utilization) (in cycles of a DMA core) of the first operation, a runtime power cost of the first operation, and/or a runtime accuracy (or a runtime accuracy loss) of the first operation, etc.

In another example, the system can generate a first timestamp corresponding to a start time of the first operation and a second timestamp corresponding to a completion time of the first operation. In this example, the system can derive a performance metric representing an execution time (e.g., a number of clock cycles) of the first operation based on the first timestamp and the second timestamp (e.g., a difference between the first timestamp and the second timestamp).

6.2.2 Layer-Level Runtime Performance Metrics

In another implementation, the system can generate the set of runtime performance metrics including a second subset of runtime performance metrics for the set of layers. In this implementation, the system can generate a runtime performance metric (or a subset of runtime performance metrics) for each layer in the set of layers.

For example, the system can generate a third runtime performance metric (or a third subset of runtime performance metrics) for a first layer in the set of layers during execution of the first layer by the processing device. In this example, the system can generate the third runtime performance metric representing a runtime computational cost (in cycles of a processing unit) of executing the first layer by the processing device. Additionally, the system can generate runtime performance metrics representing a runtime memory bandwidth cost (in cycles of a DMA core) of the first layer, a runtime power cost of the first layer, and/or a runtime accuracy (or runtime accuracy loss) of the first layer, etc.

Similarly, the system can generate the set of runtime performance metrics including a third subset of runtime performance metrics for the set of nodes in a DAG representing the target neural network. In this implementation, the system can generate a runtime performance metric (or a subset of runtime performance metrics) for each node in the set of nodes. For example, the system can generate a runtime performance metric representing memory bandwidth utilization for a first node in the set of nodes, the first node including a subset of operations in the set of operations.

In one implementation, the system can generate a runtime performance metric for a particular layer based on a subset of runtime performance metrics for a subset of operations defined by the particular layer. For example, the system can: generate a subset of runtime performance metrics representing computation costs of a first subset of operations defined by a first layer; and generate a second runtime performance metric—representing a computational cost of the first layer—based on the first subset of runtime performance metrics (e.g., a sum of the first subset of runtime performance metrics).

In another example, the system can generate a set of timestamps corresponding to start times and completion times of each operation in the subset operations defined by the particular layer; and derive a performance metric representing an execution time (e.g., a number of clock cycles) of the particular operation based on a first timestamp—representing a start time of an initial operation in the particular layer—and a second timestamp representing a completion time of a final operation in the particular layer (e.g., a difference between the first timestamp and the second timestamp). In this example, the system can associate the initial operation and the final operation with the particular layer based on metadata (e.g., layer ID).

Accordingly, the system can derive runtime performance metrics—for layers (and/or nodes) in a target neural network—from performance metrics captured and/or generated for operations during execution of the target neural network by the processing device.

In another implementation, the system can access a set of runtime performance metrics—representing the set of layers in the target neural network—captured during execution of the target neural network by the processing device. For example, the processing device can capture a first runtime performance metric representing a computational cost for a first layer in the set of layers. In this example, the client device can then access the first runtime performance metric from the processing device.

6.2.3 Network-Level Runtime Performance Metrics

In another implementation, the system can generate the set of runtime performance metrics including a fourth subset of runtime performance metrics for the overall target neural network.

For example, the system can generate a fourth runtime performance metric (or a fourth subset of runtime performance metrics) during execution of the target neural network by the processing device. In this example, the system can generate the fourth runtime performance metric representing a speed (in a number of inferences per second) resulting from execution of the target neural network by the processing device. Additionally, the system can generate runtime performance metrics representing a runtime computational cost (in cycles of a processing unit) of the target neural network, a runtime memory bandwidth cost (in cycles of a DMA core) of the target neural network, a runtime power cost of the target neural network, and/or a runtime accuracy (or runtime accuracy loss) of the target neural network, etc.

6.2.4 Device-Level Runtime Performance Metrics

In another implementation, the system can generate the set of runtime performance metrics including a fifth subset of runtime performance metrics for the processing device. In this implementation, the system can generate a runtime performance metric (or a subset of runtime performance metrics) for each resource in the set of resources of the processing device and/or for the processing device overall.

For example, the system can generate a fifth runtime performance metric (or a fifth subset of runtime performance metrics) for the processing device during execution of the target neural network. In this example, the system can generate the fifth runtime performance metric representing utilization of a first processing unit (in cycles of the first processing unit) in a set of processing units within the processing device. More specifically, the system can generate the fifth runtime performance metric representing the utilization of the first processing unit during execution of each operation in the set of operations, each node in the set of nodes, each layer in the set of layers, and/or the target neural network. The system can similarly generate a runtime performance metric (or subset of runtime performance metrics) for each resource (e.g., DMA core, transfer bus, communication bus, PCIe bus, AXI bus) in the set of resources of the processing device.

Additionally, the system can generate runtime performance metrics representing interrupt latency (in number of cycles of a control processor), idle time (in number of cycles of a control processor), task execution time (in number of cycles of a processing unit or DMA core), task wait time (in number of cycles of a processing unit or DMA core), and/or unallocated time (in number of cycles of a processing unit or DMA core), etc.

7. PROFILER OUTPUT

Generally, the system can generate an output indicating performance of the target neural network on the processing device. More specifically, the system (e.g., the client device) can generate an output indicating expected performance metrics, runtime performance metrics, deviations between expected performance metrics and runtime performance metrics, real-time processing device utilization, classification of layers in a target neural network, and/or device type comparison, etc. The system can serve the output at a user interface, such as at a user interface of the profiling application executing on the client device and/or at an interface of third-party visualization software (e.g., executing on the client device, executing on another device). Additionally, the system can store the performance metrics (e.g., expected performance metrics, runtime performance metrics) and/or other outputs at a data repository (e.g., time-series database). For example, the system can integrate with time-series databases (e.g., third-party time-series databases) to record the performance metrics and other outputs of the profiling application.

In one implementation, in Block S130, the system (e.g., the client device) can generate and serve, at a user interface, a notification indicating a runtime performance metric (or a set of runtime performance metrics). More specifically, the system can generate and serve the notification during execution of the target neural network by the processing device (e.g., real-time notification). Additionally or alternatively, the system can generate and serve the notification during a time period succeeding completion of execution of the target neural network (e.g., post-execution notification).

For example, the system can generate a notification indicating: a first runtime performance metric representing memory bandwidth utilization for a first node of the target neural network; a second runtime performance metric representing a computational cost of a first layer of the target neural network; a third runtime performance metric representing a memory bandwidth cost of the first layer; and/or a fourth runtime performance metric representing a number of inferences per second resulting from execution of the target neural network by the processing device. The system can then serve this notification at a user interface. Alternatively, the system can independently generate and serve a notification for each of these runtime performance metrics.

7.1 Performance Deviation

Blocks of the method S100 recite, for each operation in the set of operations: calculating a first difference between a runtime performance metric, in the first subset of runtime performance metrics, for an operation and a corresponding estimated performance metric, in the first subset of estimated performance metrics, for the operation in Block S124; and, in response to detecting the first difference exceeding a first threshold, adding the operation to a subset of deviant operations in the set of operations in Block S126.

Block S132 of the method S100 recites serving, at a user interface, a notification indicating the subset of deviant operations.

Generally, as shown in FIG. 3, the system can: detect a deviation between a runtime performance metric and a corresponding expected performance metric; and generate an alert at a user interface in response to detecting the deviation exceeding a threshold.

In one implementation, the system (e.g., the client device) can: calculate a difference (e.g., 528 cycles, 198%) between a first runtime performance metric (e.g., 795 cycles) for a first operation and a first expected performance metric (e.g., 267 cycles) for the first operation in Block S124; and generate an alert at a user interface in response to detecting the difference exceeding a threshold (e.g., 100%) in Block S132. For example, the system can generate a notification indicating an identifier of the first operation, the first expected performance metric, the first runtime performance metric, the difference, a node identifier, and/or a layer ID, etc.

In one variation, in response to detecting the difference exceeding the threshold, the system can add the first operation to a subset of deviant operations in Block S126. The system can then generate and serve a notification indicating the subset of deviant operations in Block S132. For example, the system can then generate and serve a notification indicating, for each operation in the subset of deviant operations, an identifier of the operation, the expected performance metric of the operation, the runtime performance metric of the operation, the difference, a node identifier, and/or a layer ID of the operation, etc.

The system can repeat this process for each operation in the set of operations.

Additionally or alternatively, the system can execute similar methods and techniques to: calculate a difference between a runtime performance metric for a layer (or a node, the target neural network, a processing device resource, etc.) and a corresponding expected performance metric for the layer; add the layer to a subset of deviant layers in response to detecting the difference exceeding a threshold; and serve a notification indicating the subset of deviant layers and information associated with these deviant layers.

7.2 Accuracy Loss

In one example, the system can: generate an estimated performance metric representing an expected accuracy of a first layer; access a set of saturation counts captured by a set of saturation counters in the processing device; and generate a runtime metric—representing an accuracy of the first layer during execution of the target neural network by the processing device—based on the set of saturation counts. In this example, the system can serve an alert at the user interface in response to detecting a difference between the runtime performance metric of the first layer and the expected performance metric of the first layer exceeding a threshold.

Accordingly, the system can detect specific instances (e.g., operations, nodes, layers) of significant accuracy loss (e.g., exceeding a predefined threshold) during execution of a target neural network, such as in a quantization process to convert floating-point values to fixed-point values, thereby enabling a user to adjust parameters and/or topology based on these instances to increase accuracy of the target neural network.

7.3 Real-Time Monitoring & Load Balancing

Generally, the system can execute Blocks of the method S100 to perform real-time monitoring of the processing device during execution of the target neural network.

In one implementation, in Block S122, the system can generate a runtime performance metric representing utilization of a first resource (e.g., a first processing unit in a set of processing units in the processing device) in the first set of resources. The system can generate and serve a notification indicating the runtime performance metric in Block S130.

Additionally, in response to detecting the runtime performance metric exceeding a threshold utilization (e.g., 80%, 100%), the system can serve an alert at the user interface in Block S132.

The system can repeat this process for each resource in the set of resources of the processing device and/or for overall utilization of the processing device.

For example, the system can: generate a runtime performance metric representing overall utilization of a first processing device; and, in response to detecting the runtime performance metric exceeding a threshold utilization (e.g., 80%, 100%), load balance execution of the target neural network between the first processing device and a second processing device. More specifically, the system can route new inputs of the target neural network to the second processing device in response to detecting the runtime performance metric exceeding the threshold.

Additionally or alternatively, the system can integrate with an external monitoring system (e.g., local monitoring system, remote monitoring system) to record the performance metrics and other outputs of the profiling application.

Accordingly, the system can characterize resource utilization during execution of a target neural network on a single processing device and/or a fleet of processing devices, thereby: enabling a user to locally and/or remotely monitor real-time performance metrics. Additionally, the system can automatically adjust execution (e.g., load balancing) of the target neural network across a set of processing devices based on this characterization, thereby increasing overall performance.

8. EXECUTION TIMELINE

Blocks of the method S100 recite: generating a first execution timeline representing expected execution of the target neural network based on the static schedule and the set of expected performance metrics in Block S140; generating a second execution timeline representing execution of the target neural network by the processing device based on the set of runtime performance metrics in Block S142; and serving, at the user interface, a visualization depicting the first execution timeline and the second execution timeline in Block S144.

Figure 5:
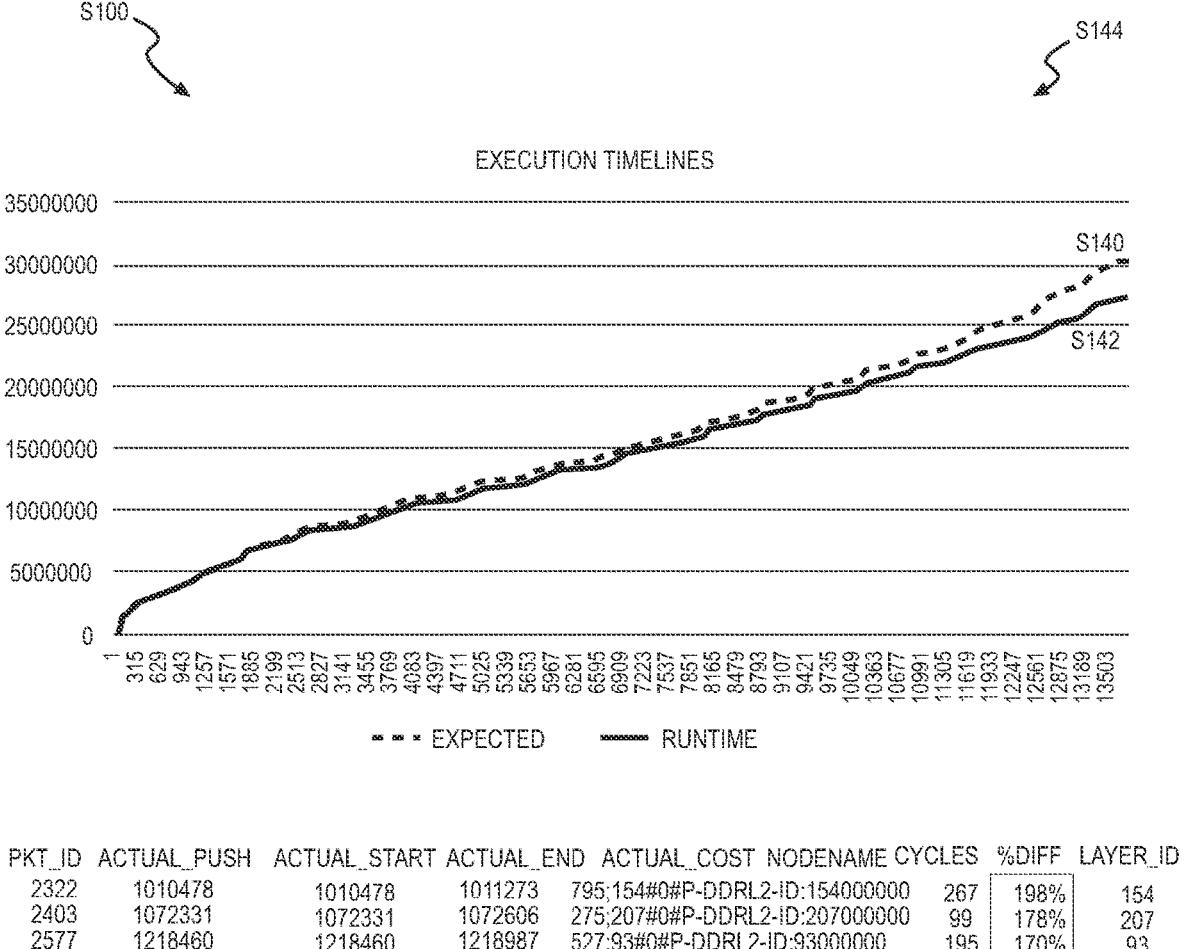
FIG. 5 is a graphical representation of one variation of the method.

Generally, as shown in FIGS. 4 and 5, the system can: reconstruct predicted and actual execution timelines of the target neural network on the processing device; and generate a visualization depicting these execution timelines. More specifically, the system can generate the visualization indicating deviations between the predicted (e.g., expected) execution timeline and the actual execution timeline.

In one implementation, in Block S140, the system can generate a first execution timeline representing expected execution of the target neural network (or a portion of the target neural network) based on the static schedule and the set of expected performance metrics. In this implementation, the system can map expected execution of each operation in the set of operations as a function of overall execution time (in cycles of a processing unit or a DMA core) of the target neural network by the processing device.

In another implementation, in Block S142, the system can generate a second execution timeline representing execution of the target neural network (or a portion of the target neural network) by the processing device based on the set of runtime performance metrics. In this implementation, the system can map runtime execution of each operation in the set of operations as a function of overall execution time (in cycles of a processing unit or a DMA core) of the target neural network by the processing device.

In another implementation, in Block S144, the system can generate and serve a visualization depicting the first execution timeline and the second execution timeline at a user interface. More specifically, the system can generate the visualization aligning (and/or overlaying) the first execution timeline and the second execution timeline as a function of overall execution time (in cycles of a processing unit or a DMA core) of the target neural network by the processing device.

Additionally, the system can generate and serve the visualization specifying deviant operations, nodes, and/or layers. For example, the system can identify a subset of deviant operations as described above (e.g., in response to detecting a difference between a runtime performance metric for an operation and an expected performance metric for the operation exceeding a threshold) and specify the subset of deviant operations in the visualization.

In another implementation, the system can highlight and/or indicate these deviant operations, deviant nodes, and/or deviant layers within the first execution timeline and the second execution timeline.

Accordingly, the system can depict deviations between the expected execution timeline and the actual execution timeline of the target neural network, thereby enabling a user to reconcile differences between expected and runtime execution of the target neural network on a processing device and debug specific (e.g., deviant) operations, nodes, and/or layers of the target neural network.

9. LAYER CLASSIFICATION

Generally, the system can identify each layer in the target neural network as a compute-bound layer or a bandwidth-bound layer. More specifically, the system can: identify a layer as a compute-bound layer based on a number of compute cycles per instruction associated with the layer; and/or identify the layer as a bandwidth-bound layer based on a number of data movement cycles per instruction associated with the layer.

9.1 Compute-Bound Layer

In one implementation, the system can: generate a runtime metric representing a first number of compute cycles per instruction in a first layer in the set of layers in Block S122; in response to detecting the first number of compute cycles per instruction in the first layer exceeding a threshold, add the first layer to a subset of compute-bound layers in the set of layers in Block S150; and serve, at the user interface, a notification indicating the subset of compute-bound layers in Block S130.

Generally, for each layer in the target neural network, the system can identify the layer as a compute-bound layer based on a number of compute cycles per instruction associated with the layer. In particular, the system can access a performance metric representing a number of instructions issued for the layer and a performance metric representing a number of compute cycles for the layer.

In one implementation, the processing device can record these performance metrics via performance monitor registers communicatively coupled to a control processor configured to issue instructions to processing units of the processing device to capture the number of instructions issued for the layer. In this implementation, each instruction at the control processor can include descriptive metadata indicating the associated layer for each instruction. Additionally, in this implementation, the processing device can capture the number of compute cycles for the layer via performance monitor registers configured to record processor cycles for the set of processing units of the processing device. In response to detecting completion of a layer (e.g., based on a transition from a first layer ID to a second layer ID based on metadata associated with DMA descriptors), the processing device can extract this data from the performance monitor registers to the main memory of the processing device. Accordingly, the processing device can record performance metrics for calculating a ratio of compute cycles per instruction.

In one implementation, the system can identify a layer as a compute-bound layer in response to detecting the ratio of compute cycles per instruction exceeding a threshold ratio of compute cycles per instruction for the layer. However, the system can calculate any other metric based on the number of instructions and number of compute cycles for the layer.

9.2 Bandwidth-Bound Layer

In one implementation, the system can: generate a runtime metric representing a first number of data movement cycles per instruction in a first layer in the set of layers in Block S122; in response to detecting the first number of data movement cycles per instruction in the first layer exceeding a threshold, add the first layer to a subset of bandwidth-bound layers in the set of layers in Block S152; and serve, at the user interface, a notification indicating the subset of bandwidth-bound layers in Block S130.

Generally, for each layer in the target neural network, the system can identify the layer as a bandwidth-bound layer based on a number of data movement cycles per instruction associated with the layer. In particular, the system can access a performance metric representing a number of instructions issued for the layer and a performance metric representing a number of data movement cycles for the layer.

In one implementation, the processing device can record these performance metrics via performance monitor registers, as described above. Additionally, in this implementation, the processing device can capture the number of data movement cycles for the layer via performance monitor registers configured to record processor cycles for the set of DMA cores of the processing device. In response to detecting completion of a layer (e.g., based on a transition from a first layer ID to a second layer ID based on metadata associated with DMA descriptors), the processing device can extract this data from the performance monitor registers to the main memory of the processing device. Accordingly, the processing device can record performance metrics for calculating a ratio of data movement cycles per instruction.

In one implementation, the system can identify a layer as a bandwidth-bound layer in response to detecting the ratio of data movement cycles per instruction exceeding a threshold ratio of data movement cycles per instruction for the layer. However, the system can calculate any other metric based on the number of instructions and number of data movement cycles for the layer.

10. DEVICE TYPE COMPARISON

Generally, the system can execute similar methods and techniques as described above to: profile execution of a target neural network by different processing devices characterized by different device types; and detect a higher (or highest) performing processing device for the target neural network based on runtime performance metrics.

For example, the system can detect that—for a first target neural network exhibiting a majority of compute-bound layers—a first processing device characterized by a first device type is higher-performing than a second processing device characterized by a second device type based on runtime performance metrics (e.g., inferences per second, execution time, accuracy). In another example, the system can detect that—for a second target neural network exhibiting a majority of bandwidth-bound layers—the second processing device is higher-performing than the first processing device based on runtime performance metrics.

In one implementation, the system can: access a first static schedule of a target neural network for execution by a first processing device characterized by a first device type in Block S102; generate a first set of expected performance metrics for the target neural network based on the first static schedule in Block S104; and generate a first set of runtime performance metrics during execution of the target neural network by the first processing device, including a first runtime performance metric representing a first number of inferences per second resulting from execution of the target neural network by the first processing device in Block S122.

In this implementation, the system can: access a second static schedule of the target neural network for execution by a second processing device characterized by a second device type different from the first device type in Block S102; generate a second set of expected performance metrics for the target neural network based on the second static schedule in Block S104; and generate a second set of runtime performance metrics during execution of the target neural network by the second processing device, including a second runtime performance metric representing a second number of inferences per second resulting from execution of the target neural network by the second processing device in Block S122. In response to detecting the first number of inferences per second exceeding the second number of inferences per second, the system can serve a notification indicating the first processing device as a higher performing processing device for the target neural network than the second processing device at a user interface in Block S132. Alternatively, in response to detecting the first number of inferences per second falling below the second number of inferences per second, the system can serve a notification indicating the second processing device as a higher performing processing device for the target neural network than the first processing device at the user interface in Block S132.

In one variation, the system can similarly generate and compare other runtime performance metrics (e.g., execution time, power consumption, accuracy) during respective executions of the target neural network on the first processing device and the second processing device to identify the higher performing processing device.

Accordingly, the system can compare performance of a particular target neural network across processing devices of different device types, thereby enabling a user to identify a higher-performing device type for the particular target neural network.

11. ITERATIVE PERFORMANCE TUNING

Generally, the system can generate an output—indicating performance of the target neural network (i.e., a static schedule for the target neural network) on the processing device—including expected performance metrics, runtime performance metrics, deviations between expected performance metrics and runtime performance metrics, real-time processing device utilization, classification of layers in a target neural network, and/or device type comparison, etc. Additionally, the system can then analyze this output to adjust parameters in the static schedule to improve performance of the target neural network during execution on the processing device.

More specifically, as shown in FIG. 6, the system can: generate an initial schedule for a target neural network based on an initial set of parameters in Block S102; generate a set of expected performance metrics based on the initial static schedule in Block S104; generate a set of runtime performance metrics during execution of the initial static schedule of the target neural network on the processing device in Block S120; and output these performance metrics in Blocks S130, S132, and S144.

In one implementation, in Block S146, the system can generate an updated static schedule of the target neural network based on the performance metrics. For example, the system (e.g., a compiler, a machine learning system) can analyze these performance metrics—such as specific operations exhibiting deviations between expected performance and runtime performance, specific layers classified as compute-bound or bandwidth-bound, etc.—to adjust the initial set of parameters into an updated set of parameters; and generate an updated static schedule, for the target neural network. based on the updated set of parameters. The system can then execute the updated static schedule and generate performance metrics for this updated static schedule accordingly.

Accordingly, the system can repeat the foregoing methods to iteratively refine parameters of a static schedule for the target neural network over multiple profiling periods, thereby incrementally and autonomously improving performance of the target neural network on the processing device with each iteration.

12. CONCLUSION

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for profiling neural network performance, the method comprising:

accessing a static schedule of a target neural network for execution by a processing device, the target neural network comprising a set of layers defining a set of operations;

generating a set of expected performance metrics for the target neural network based on the static schedule, the set of expected performance metrics comprising a subset of expected performance metrics for each layer in the set of layers;

activating a set of performance monitor registers in the processing device based on signals stored in a memory of the processing device;

capturing, by the set of performance monitor registers, a set of runtime performance metrics during execution of the target neural network by the processing device;

for each layer in the set of layers:

associating a subset of runtime performance metrics, in the set of runtime performance metrics, with the layer based on detection of an identifier assigned to the layer during execution of the layer;

calculating a first difference between a runtime performance metric, in the subset of runtime performance metrics for the layer, and a corresponding estimated performance metric in the subset of estimated performance metrics for the layer; and in response to detecting the first difference exceeding a first threshold, identifying the layer as a deviant layer in a subset of deviant layers in the set of layers; and serving, at a user interface, a notification indicating the subset of deviant layers.

2. The method of claim 1:

wherein generating the set of expected performance metrics comprises generating the set of expected performance metrics further comprising a second subset of expected performance metrics for each operation in the set of operations;

wherein generating the set of runtime performance metrics comprises generating the set of runtime performance metrics further comprising a second subset of runtime performance metrics for each operation in the set of operations; and further comprising:

for each operation in the set of operations:

calculating a second difference between a runtime performance metric, in the second subset of runtime performance metrics for the operation, and a corresponding expected performance metric in the second subset of estimated performance metrics for the operation; and in response to detecting the second difference exceeding a second threshold, identifying the operation as a deviant operation in a subset of deviant operations in the set of operations; and serving, at the user interface, a notification indicating the subset of deviant operations.

3. The method of claim 1:

wherein capturing the set of runtime performance metrics comprises capturing the set of runtime performance metrics comprising a first runtime metric representing a first number of compute cycles per instruction in a first layer in the set of layers; and further comprising:

in response to detecting the first number of compute cycles per instruction in the first layer exceeding a second threshold, identifying the first layer as a compute-bound layer in a subset of compute-bound layers in the set of layers; and serving, at the user interface, a notification indicating the subset of compute-bound layers.

4. The method of claim 1:

wherein capturing the set of runtime performance metrics comprises capturing the set of runtime performance metrics comprising a first runtime metric representing a first number of data movement cycles per instruction in a first layer in the set of layers; and further comprising:

in response to detecting the first number of data movement cycles per instruction in the first layer exceeding a second threshold, identifying the first layer as a bandwidth-bound layer in a subset of bandwidth-bound layers in the set of layers; and serving, at the user interface, a notification indicating the subset of bandwidth-bound layers.

5. The method of claim 1, further comprising:

generating a first execution timeline representing expected execution of the target neural network based on the static schedule and the set of expected performance metrics;

generating a second execution timeline representing execution of the target neural network by the processing device based on the set of runtime performance metrics; and serving, at the user interface, a visualization depicting the first execution timeline and the second execution timeline.

6. The method of claim 1:

further comprising accessing a cost model defining a set of costs for each operation in the set of operations; and wherein generating the set of expected performance metrics comprises generating the set of expected performance metrics based on the static schedule and the cost model.

7. The method of claim 1:

wherein accessing the static schedule comprises accessing the static schedule assigning a set of nodes, defining the set of operations in a directed acyclic graph, to a set of resources in the processing device;

wherein capturing the set of runtime performance metrics comprises capturing the set of runtime performance metrics comprising a second runtime performance metric representing memory bandwidth utilization for a first node in the set of nodes, the first node comprising a subset of operations in the set of operations; and further comprising serving, at the user interface, a notification indicating the second runtime performance metric.

8. The method of claim 1, wherein activating the set of performance monitor registers comprises:

writing a set of signals to a set of memory regions, in the memory of the processing device, mapped to the set of performance monitor registers; and selectively activating the set of performance monitor registers based on the set of signals stored in the set of memory regions.

9. The method of claim 1:

wherein capturing the set of runtime performance metrics comprises capturing the set of runtime performance metrics further comprising:

a second runtime performance metric representing a computational cost of a first layer in the set of layers; and a third runtime performance metric representing a memory bandwidth cost of the first layer; and further comprising serving, at the user interface, a notification indicating the second runtime performance metric and the third runtime performance metric.

10. The method of claim 9, wherein capturing the set of runtime performance metrics comprises generating the second runtime performance metric based on a second subset of runtime performance metrics in the set of runtime performance metrics, the second subset of runtime performance metrics representing computation costs of a first subset of operations defined by the first layer.

11. The method of claim 1, wherein associating the subset of runtime performance metrics for each layer in the set of layers comprises:

in response to detecting a change in execution from the layer to a succeeding layer in the set of layers, extracting the subset of runtime performance metrics from the set of performance monitor registers; and transferring the subset of runtime performance metrics to a main memory of the processing unit via a direct memory access core.

12. The method of claim 11, wherein extracting the subset of runtime performance metrics from the set of performance monitor registers comprises:

detecting the change in execution from the layer to the succeeding layer by:

reading a first set of bits corresponding to the identifier assigned to the layer in a first dequeued command in a control processor of the processing device; and reading a second set of bits corresponding to a second identifier assigned to the succeeding layer in a second dequeued command in the control processor; and in response to detecting the change in execution from the layer to the succeeding layer, extracting the subset of runtime performance metrics from the set of performance monitor registers.

13. A method for profiling neural network performance, the method comprising:

accessing a first static schedule of a target neural network for execution by a first processing device comprising a first set of resources, the target neural network comprising a set of layers defining a set of operations;

generating a first set of expected performance metrics for the target neural network based on the first static schedule, the first set of expected performance metrics comprising a first expected performance metric for a first layer in the set of layers; and during execution of the target neural network by the first processing device:

activating a set of performance monitor registers in the processing device based on signals stored in a memory of the processing device;

capturing, by the set of performance monitor registers, a first set of runtime performance metrics for the target neural network;

associating a first runtime performance metric, in the first set of runtime performance metrics, with the first layer based on detection of a first identifier assigned to the first layer during execution of the first layer;

in response to detecting a difference between the first runtime performance metric and the first expected performance metric exceeding a first threshold, identifying the first layer as a deviant layer in a subset of deviant layers in the set of layers; and serving, at a user interface, a notification indicating the subset of deviant layers.

14. The method of claim 13:

wherein capturing the first set of runtime performance metrics comprises capturing the first set of runtime performance metrics comprising a second runtime performance metric representing a first number of inferences per second resulting from execution of the target neural network by the first processing device; and further comprising serving, at the user interface, a notification indicating the second runtime performance metric.

15. The method of claim 14:

wherein accessing the first static schedule comprises accessing the first static schedule of the target neural network for execution by the first processing device characterized by a first device type; and further comprising:

accessing a second static schedule of the target neural network for execution by a second processing device characterized by a second device type different from the first device type;

generating a second set of expected performance metrics for the target neural network based on the second static schedule;

generating a second set of runtime performance metrics during execution of the target neural network by the second processing device, the second set of runtime performance metrics comprising a third runtime performance metric representing a second number of inferences per second resulting from execution of the target neural network by the second processing device; and in response to detecting the first number of inferences per second exceeding the second number of inferences per second, serving, at the user interface, a notification indicating the first processing device as a higher performing processing device for the target neural network than the second processing device.

16. The method of claim 13:

wherein generating the first set of expected performance metrics comprises generating the first set of expected performance metrics comprising a second estimated performance metric representing an expected accuracy of the first layer in the set of layers;

wherein capturing the first set of performance metrics comprises capturing a set of saturation counts by a set of saturation counters in the set of performance monitor registers;

wherein capturing the first set of runtime performance metrics comprises generating a second runtime performance metric, in the first set of runtime performance metrics, based on the set of saturation counts, the second runtime performance metric representing an accuracy of the first layer during execution of the target neural network by the first processing device; and further comprising, in response to detecting a difference between the second runtime performance metric and the second expected performance metric exceeding a first threshold, serving an alert at the user interface.

17. The method of claim 13:

wherein capturing the first set of runtime performance metrics comprises capturing the first set of runtime performance metrics comprising a second runtime performance metric representing utilization of a first resource in the first set of resources; and further comprising, in response to detecting the second runtime performance metric exceeding a second threshold, serving an alert at the user interface.

18. The method of claim 13, further comprising writing, to a first memory region mapped to a first performance monitor register in the set of performance monitor registers, a signal representing a command to disable the first performance monitor register.

19. The method of claim 13:

wherein capturing the first set of runtime performance metrics comprises capturing the first set of runtime performance metrics comprising a second runtime performance metric representing utilization of the first processing device; and further comprising, in response to detecting the second runtime performance metric exceeding a second threshold, load balancing execution of the target neural network between the first processing device and a second processing device.

20. A method for profiling neural network performance, the method comprising:

accessing a static schedule of a target neural network for execution by a first processing device, the target neural network comprising a set of layers;

generating a set of expected performance metrics of the target neural network based on the static schedule, the set of expected performance metrics comprising a first expected performance metric for a first layer in the set of layers;

activating a set of performance monitor registers in the first processing device based on signals stored in a memory of the first processing device;

capturing, by the set of performance monitor registers, a set of runtime performance metrics during execution of the target neural network by the first processing device, the set of runtime performance metrics comprising:

a first runtime performance metric for the first layer; and a second runtime performance metric representing utilization of the first processing device;

associating the first runtime performance metric with the first layer based on detection of a first identifier assigned to the first layer during execution of the first layer;

in response to detecting a difference between the first runtime performance metric and the first expected performance metric exceeding a threshold, identifying the first layer as a deviant layer in a subset of deviant layers in the set of layers; and serving, at a user interface, a notification indicating the subset of deviant layers.

\* \* \* \* \*